United States Patent [19] [11] 3,771,536
Dragan [45] Nov. 13, 1973

[54] DENTAL FLOSS AND METHOD OF MAKING SAME
[76] Inventor: William B. Dragan, R.F.D. No. 1, Burr St., Fairfield, Conn.
[22] Filed: May 8, 1972
[21] Appl. No.: 251,241

[52] U.S. Cl. .................................................. 132/89
[51] Int. Cl. ............................................. A61c 15/00
[58] Field of Search ......................... 132/89, 90, 91; 424/93

[56] References Cited
UNITED STATES PATENTS
2,700,636  1/1955  Ashton .................................. 424/93
3,330,732  7/1967  Muhler .................................. 424/93
174,619    3/1876  Clark, Jr. .............................. 132/89
2,381,142  8/1945  Stonehill .............................. 132/89

Primary Examiner—Louis G. Mancene
Assistant Examiner—Gregory E. McNeill
Attorney—Arthur T. Fattibene

[57] ABSTRACT

This disclosure is directed to an improved dental floss and a method of making it. The improved dental floss comprises a plurality of fibers, e.g., nylon fiber bonded by a non-wax coating and in which there is dispersed various therapeutic agents which are active to remove the bacteria media that promotes bacterial growth about the teeth and mouth. The disclosure is also directed to a method for forming such dental floss in a manner which permits various therapeutic agents to be simultaneously bonded in the coating of the fibers.

6 Claims, 2 Drawing Figures

Patented Nov. 13, 1973

3,771,536

3,771,536

DENTAL FLOSS AND METHOD OF MAKING SAME

PROBLEM AND PRIOR ART

Research has indicated that tooth decay and dental disease is readily attributed to bacterial action resulting from the formation of plaque about the teeth and/or the entrapment of food particles between the teeth and interstices formed therebetween. Conventional care of the teeth by brushing has been found to be an inadequate means for effecting the removal of entrapped food particles from some crevices which may exist between the teeth in certain instances and/or to effectively remove the plaque by which the bacteria adheres to the teeth.

To supplement conventional brushing, resort has been frequently made to the use of dental floss which is rendered more effective than brushing in removing plaque and/or the stubbornly entrapped food particles from crevices which are inaccessible to ordinary brushing. However, most prior known dental floss comprised essentially of fibers bonded by a wax coating, e.g., a beeswax, petroleum wax and the like. However, research has shown that the wax with which such dental floss has been coated formed a media which is conducive to bacteria growth and development. While such floss effectively removed the entrapped food particles, portions of the wax coating invariably remained to provide the food requirements for bacterial action, and thereby greatly nullified the effectiveness thereof.

Efforts have also been made to incorporate various agents in the coating of such floss to further enhance oral hygiene. However, such agents have been restricted to a dentrifice to assist in neutralizing or buffering the acidity found within the mouth, and/or to provide an antiseptic action. Some of the known efforts to improve dental floss directed toward the ends for added oral hygiene are evidence by U. S. Letters Pat. Nos. 1,069,874; 2,748,781; 2,700,636 and 2,772,205.

OBJECTS

It is an object of this invention to provide an improved dental floss and method of forming the same that is rendered more effective in the removal of plaque and thereby results in minimized bacterial action within the mouth and resulting tooth decay.

Another object is to provide an improved dental floss having a non-wax coating in which there is incorporated a polishing agent to assist in the removal of plaque and entrapped food particles from the teeth.

Another object is to provide a method for forming the improved dental floss wherein the addition of one or more therapeutic agents may be simultaneously bonded in a non-wax coating thereof.

Another object is to provide an improved dental floss which is enhanced by a pleasant flavoring.

BRIEF SUMMARY OF THE INVENTION

The foregoing objects and other features and advantages are attained by a dental floss formed of a plurality of fibers, preferably nylon, formed by doubling and which are loosely bonded by a non-wax coating which has dispersed therein a polishing agent, e.g., a zirconium silicate and/or a therapeutic agent or flavoring matter.

The dental floss is formed of a plurality of nylon fibers coated or bonded by an alcohol soluble nylon in which there is dispersed a dental grade polishing agent such a zirconium silicate and/or a therapeutic or flavoring agent.

FEATURES

A feature of this invention resides in the provision of an improved dental floss formed of fibers loosely bonded by a nonwax coating having dispersed therein a polishing agent which enhances the removal of plaque formation on teeth.

Another feature resides in a readily simple and inexpensive method by which the improved dental floss embodying the invention may be made.

Other features and advantages will become more readily apparent when considered in view of the drawing and specification in which.

Figure 1:
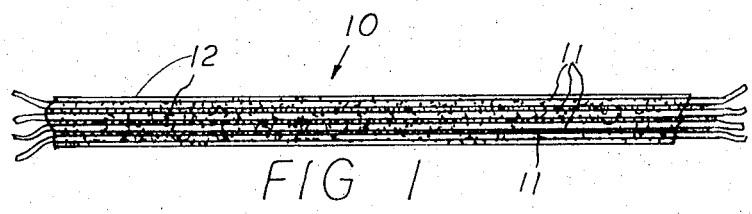
FIG. 1 is a side view of a dental floss embodying the present invention.
Figure 2:
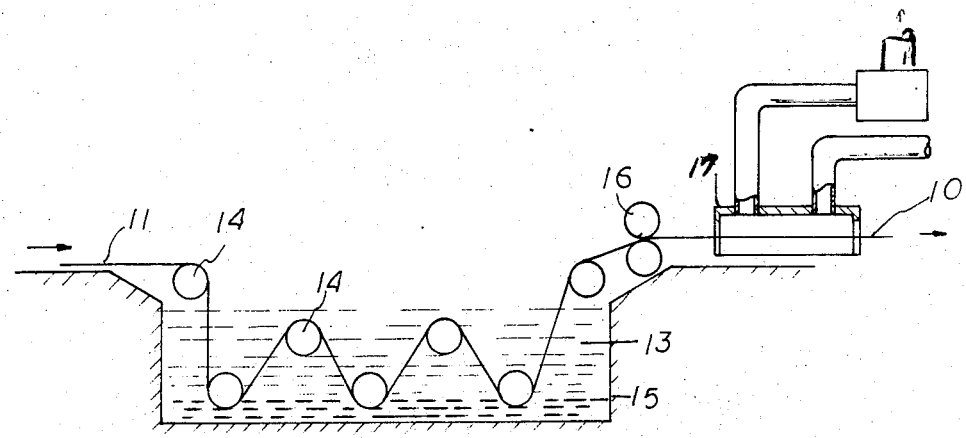
FIG. 2 is a diagrammatic view illustrating an apparatus by which the dental floss may be formed.

Referring to FIG. 1 there is shown a dental floss construction 10 embodying the present invention. The dental floss comprises a plurality of either natural or man-made fibers 11 which are bonded or coated with a coating 12 of a non-wax substance. Preferably the fibers 11 are formed of a nylon filament or thread and are combined to form floss by doubling; i.e., by a process in which the threads are not twisted. The fibers thus formed in floss by doubling are then subjected to or pulled through a bath 13 of an alcohol soluble nylon to which there has been added a suitable polishing agent, e.g., a dental grade zirconium silicate. The alcohol soluble nylon which may be used as the coating material is of a type manufactured by E. I. DuPont, also known as Elvamide 8061. It will be understood that other dental grade polishing agents may also be used in place of the zirconium silicate. For example, the polishing agent may comprise a tin oxide, pumice stone powder and other suitable dental grade polishing agents.

To facilitate the passage of the floss 10 through the coating bath suitable guide rollers 14 extend transversely of the tub 15 over which the floss is guided in passing through the bath 13. Accordingly the respective fibers 11 are coated by the soluble alcohol coating and polishing agent dispersed therethrough.

In passing from the bath 13 the coated floss may be passed between rollers 16 which function to impart a squeegee action on the floss 10 to effect the removal of any excess coating material. Thereafter the coated floss is directed through a hot air dryer 17 where the alcohol solvents in the bonding solution 13 are removed by evaporation. The floss 10 thus formed comprises loosely bonded fibers having a non-wax coating with particles of a polishing agent dispersed along the length of the floss 10.

In use, the dental floss 10 so formed is effective in removing the plaque and any particles of food which may be stubbornly entrapped between the teeth; without a residue of wax being left which would serve as a media for the growth and development of bacteria.

To enhance the therapeutic effect of the dental floss, the coating thereof may also be impregnated with various dental grade fluorides, e.g. stanous fluoride. Also a pleasing flavoring may be imparted to the floss by including in the coating thereof suitable essential oil flavorings, e.g., cherry, lemon, orange, etc. The therapeutic agents can be readily embedded or incorporated in the coating of the floss by dispersing the selected agents in the bath 13.

Therefore in forming the bath 13 the various therapeutic ingredients can be added thereto to formulate a desired coating mixture to include any combination thereof. With the coating mixture so formed, the fibers making up the floss can be readily pulled through the bath 13, the fibers being coated thereby as hereinbefore described. The surplus coating of the bath 13 is removed from the fibers by passing between squeegees or squeegee rollers.

A dental floss formed in the manner herein described exhibits a smooth film-like surface which is essentially uninterrupted and sufficiently resilient so as to be capable of freely flexing in use. The polishing agent imbedded in the coating enhances the removal of plaque when used.

It will be understood that various ingredients may be used in varying combinations and/or proportions, whereby the selected ingredients can be readily incorporated into the coating by a single application or pass of the fibers through the bath.

While the instant invention has been described with respect to a particular embodiment thereof, variations and modifications may be made without departing from the spirit and/or scope of the invention.

What is claimed is:

1. A dental floss comprising:
   a plurality of nylon fibers,
   an alcohol soluble nylon binder coating said fibers to loosely form said fibers into a mono-like filament,
   and a polishing agent dispersed along said fibers and adhered thereto by said binder coating.

2. A dental floss as defined in claim 1 and including stanous fluoride dispersed along said fibers.

3. A dental floss as defined in claim 1 and including a flavoring essential oil impregnated into said coating.

4. The invention as defined in claim 1 wherein said polishing agent is zirconium silicate.

5. A dental floss comprising:
   a plurality of fibers,
   a non-wax coating comprising alcohol soluble nylon for loosely bonding said fibers, and a therapeutic material incorporated in said coating.

6. A method of forming dental floss comprising the steps of:
   forming a cord of a plurality of fibers by doubling,
   forming a bath of alcohol soluble nylon having a dental grade polishing agent dispersedtherein,
   passing said formed cord through said bath,
   and drying said cord upon removing said cord from said bath whereby the particles of said polishing agent remain adhered to said cord, and said fibers being loosely bonded in said cord.

* * * * *